United States Patent [19]

Morito

[11] 4,214,270

[45] Jul. 22, 1980

[54] DIGITAL VERTICAL SYNC SIGNAL SEPARATOR

[75] Inventor: Hiroshi Morito, Tokyo, Japan

[73] Assignee: Nippon Electric Co., Ltd., Tokyo, Japan

[21] Appl. No.: 876,939

[22] Filed: Feb. 10, 1978

[30] Foreign Application Priority Data

Feb. 10, 1977 [JP] Japan .................................. 52/14381

[51] Int. Cl.$^2$ .......................... H04N 5/10; H03K 5/20
[52] U.S. Cl. .................................... 358/154; 328/112; 328/139; 307/234
[58] Field of Search ................ 358/154; 328/139, 111, 328/119, 112, 120, 191; 307/234, 221 R, 220 R

[56] References Cited

U.S. PATENT DOCUMENTS

| | | | |
|---|---|---|---|
| 3,551,823 | 12/1970 | Stevens | 307/234 |
| 3,667,054 | 5/1972 | Nelson | 307/234 |

*Primary Examiner*—John C. Martin
*Attorney, Agent, or Firm*—Hopgood, Calimafde, Kalil, Blaustein & Lieberman

[57] ABSTRACT

A signal detector circuit comprises a plurality of series-connected data latch circuits. An input signal and clock signals are applied to the first data latch circuit, the clock signals being effective to shift the input signal along the succeeding data latch circuits. The outputs of the data latch circuits are coupled to the plural inputs of a plurality of first logic circuits in a manner such that the outputs of different data latch circuits are combined at different ones of the first logic circuits. The outputs of the first logic circuits are combined in a second logic circuit which produces an output signal. The input signal may be a composite television synchronizing signal and the output signal may correspond to the vertical sync pluses in the composite synchronizing signal.

4 Claims, 8 Drawing Figures

DIGITAL VERTICAL SYNC SIGNAL SEPARATOR

The present invention relates generally to signal detecting circuits, and more particularly, to a digital detector circuit for pulse signals.

Vertical sync pulses in a composite sync signal of a television signal are formed of wider pulses than are the horizontal sync pulses. It has been a common practice to use an integrator circuit consisting of a capacitor and a resistor to detect vertical sync pulses and to produce a vertical sync signal. However, it is very difficult to assemble an integrator circuit of this type in a semiconductor integrated circuit, because of the need for the capacitor. As a result, several attempts have been made to obtain a vertical sync separator circuit that can be fabricated effectively in a semiconductor integrated circuit. In one such attempt, the vertical sync signal is obtained from the vertical sync pulses through a digital process which divides the frequency of the horizontal sync signal derived from horizontal sync pulses or of a signal having a frequency which is an integer multiple of that of the horizontal sync signal, and derives a vertical sync signal. This system is disclosed in U.S. Pat. Nos. 3,878,335 and 3,878,336.

In this digital process for obtaining a vertical sync signal, a signal of 31.5 KHz is derived in synchronism with the horizontal sync pulses, and a horizontal sync signal of 15.75 KHz is derived by frequency-dividing the 31.5 KHz signal. In addition, 525 cycles of the 31.5 KHz signal are counted by a divide-by-525 counter which typically consists of 10 serially connected T-type flip-flops to pick up the period of 13 cycles from the 513th to the 525th cycle as a vertical sync signal. In this prior art system, in order to assure synchronization between the vertical sync signal and the vertical sync pulses, the vertical sync pulses in the composite sync signal are detected and the divide-by-525 counter is reset by this detected signal. According to U.S. Pat. No. 3,878,335, by making use of the fact that the vertical sync pulses consist of six pulses, a time point when an eight-stage shift register arrives at the state of 01111110 is detected and the divide-by-525 counter is reset in response to this detection. Therefore, although no malfunction is caused by noise other than the vertical sync pulses, there is a shortcoming in this system in that if the number of pulses in the vertical sync pulses is reduced by the noise, the resetting of the counter is not effected. Moreover, according to U.S. Pat. No. 3,878,336, the counter is reset by a signal derived in response to the vertical sync pulses by a vertical sync separator circuit. Though the details of the vertical sync separator circuit are not described in this patent, the integrator circuit consisting of a resistor and a capacitor, which is typically employed in this kind of circuit, cannot be realized in a semiconductor integrated circuit. It is thus necessary in this system either to mount a capacitor outside of a semiconductor chip or to provide a vertical sync separator circuit as a whole separately from an integrated circuit.

A semiconductor integrated circuit for obtaining horizontal and vertical sync signals for a television receiver designated Ser. No. 76547, has recently been made public by Texas Instruments, Inc. In this semiconductor integrated circuit, data latch circuits are cascaded in two stages and a clock signal having a frequency of double the horizontal sync signal frequency and a composite sync signal are applied to the first stage. These cascaded stages are successively set by vertical sync pulses to produce a signal in response to the vertical sync pulses by ANDing the outputs of the latch circuits. In this circuit, if noise of 2 pulses (2H) corresponding to the vertical sync pulses is present at the input, this noise signal is detected as a vertical sync pulse, and if the vertical sync pulses are deformed by noise into a state of not containing 2 successive pulses, then the vertical sync pulses cannot be detected.

It is thus an object of the present invention to provide a circuit for digitally detecting vertical sync pulses in which noise does not produce a malfunction, and which is well adapted for a realization in a semiconductor integrated circuit.

According to the present invention, a signal detector circuit is provided which comprises n stages (n being an integer of three or more) of data latch circuits connected in series. An input terminal is coupled to a first stage of the latch circuits for receiving an input signal, and clock pulses are applied to the data latch circuits to shift a signal from the input terminal along the data latch circuits. A plurality of first logic circuits are provided each having $n-m$ (m being an integer from 1 to $n-2$) input ends and an output end and deriving an output in response to $n-m$ inputs. The output ends of selected $n-m$ numbers of the data latch circuits are connected to the $n-m$ input ends of respective selected ones of the first logic circuits in such a manner that the output ends of different data latch circuits are combined with the inputs ends of different ones of the first logic circuits. A second logic circuit with input ends connected to the output ends of the first logic circuits derives an output in response to one input, and an output terminal is coupled to an output end of the second logic circuit.

According to the present invention, since the detection of the vertical sync pulses can be achieved through digital processing, the signal detector circuit can readily be assembled in a semiconductor integrated circuit.

In addition, according to the present invention, a noise signal that is shorter than such noise that sets selected m data latches, i.e., noise that has a time width m times as large as the pulse in the vertical sync pulses, cannot be detected as a vertical sync pulse. Also, even if vertical sync pulses consisting of 6 pulses should be deformed into a lesser number of pulses due to noise, this train of pulses could be detected as a vertical sync pulses by the signal detector circuit of the invention, provided that at least m number of pulses are retained. Therefore, a malfunction in the circuit operation caused by noise will occur only on very rare occasions.

The above and further objects, features and advantages of the present invention will become more apparent from the following detailed description of the prior art and preferred embodiments thereof taken in conjunction with the accompanying drawings, wherein.

Figure 1:
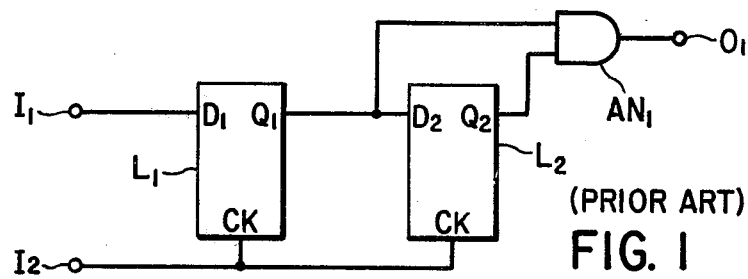
FIG. 1 is a block diagram of a prior art sync separator circuit consisting of two stages of data latch circuits.

In the prior art circuit for detecting a vertical sync pulses shown in FIG. 1, a composite sync signal $S_{i1}$ is applied to in input terminal $I_1$. Terminal $I_1$ is connected to a data input terminal $D_1$ of a first stage data latch circuit $L_1$ of two serially connected data latch circuits $L_1$ and $L_2$ a signal $C_{12}$ having a frequency equal to twice that of the horizontal sync signal is applied as a clock signal for the data latch circuits $L_1$ and $L_2$ through the other input terminal $I_2$ to which the clock terminals CK of the data latch circuits are connected in common. A noninverted output $Q_1$ of the first stage data latch circuit $L_1$ is applied to an input terminal $D_2$ of the second stage data latch circuit $L_2$, and the two noninverted outputs $Q_1$ and $Q_2$ of the data latch circuits $L_1$ and $L_2$, respectively, are applied to an AND circuit $AN_1$ to obtain a logical product of these outputs as a vertical sync signal synchronized to the vertical sync pulses at the output $O_1$ of the AND circuit.

Figure 2:
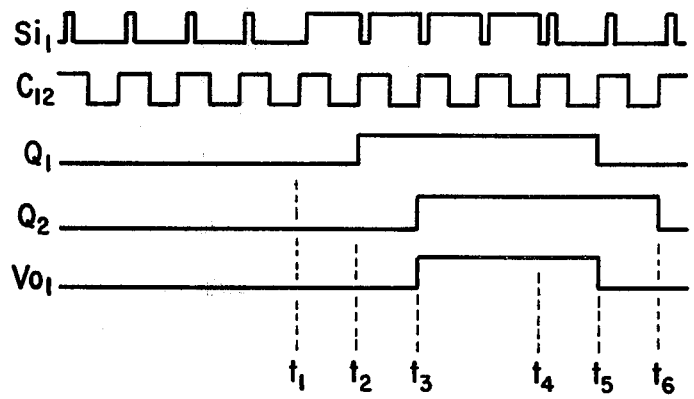
FIG. 2 is a time chart diagrammatically illustrating the operation of the circuit shown in FIG. 1.

The noninverted outputs $Q_1$ an $Q_2$ of the data latch circuits $L_1$ and $L_2$, respectively, vary in response to input signals $S_{i1}$ and $C_{12}$ as shown in FIG. 2. Assuming that vertical sync pulses are applied at time $t_1$, then the output $Q_1$ of the data latch circuit $L_1$ rises at time $t_2$ when the clock signal $C_{12}$ rises, and in response to this output the output $Q_2$ of the data latch circuit $L_2$ rises at time $t_3$ when the clock signal $C_{12}$ rises next. After the vertical sync pulses have disappeared at time $t_4$, the outputs $Q_1$ and $Q_2$ of the data latch circuits $L_1$ and $L_2$, respectively, fall at time $t_5$ and time $t_6$ in response to the clock signals, and consequently, the output $V_{o1}$ of the AND circuit $AN_1$ is obtained during the period between time $t_3$ and time $t_5$.

In the prior art circuit illustrated in FIG. 1, since all the noninverted outputs $Q_1$ and $Q_2$ of the two latch circuits $L_1$ and $L_2$ are ANDed, an output will be derived from the AND circuit $AN_1$ even in response to a noise signal of a short duration. Therefore, a malfunction of the data latch circuits caused by noise is likely to appear at the output, so that the prior art circuit is not satisfactory with respect to being able to operate independent of noise.

More particularly, although a set of vertical sync pulses consisting of 4 pulses is illustrated in FIG. 2 for simplicity of explanation, in practice one set of vertical sync pulses actually consists of 6 pulses within a period of 3H where H is a time of one scanning line, so that by serially connecting 6 data latch circuits each operating with a clock signal having a frequency of double that of the horizontal sync signal, data of 6 bits at a maximum can be detected. However, in the prior art circuit, since the separation of the vertical sync pulses is achieved by means of two data latch circuits $L_1$ and $L_2$, the presence of only two pulses is detected. If detection of such a small number of pulses is carried out, a distinction, between the vertical sync pulses and noise cannot be made so that malfunctions will frequently occur.

Figure 3:
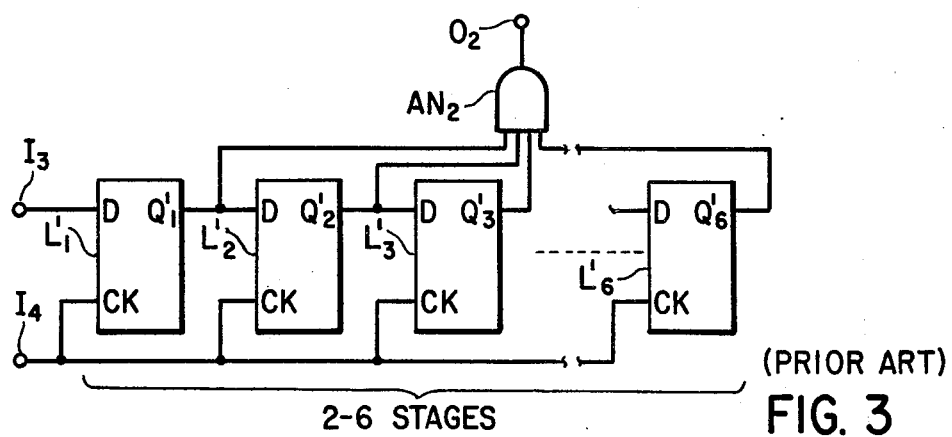
FIG. 3 is a block diagram of another prior art sync separator circuit in which data latch circuits are provided in 2 to 6 stages.

In the prior art separator circuit shown in FIG. 3, a larger number (6 at the maximum) of data latch circuits $L_1'$, $L_2'$, ..., $L_6'$ are connected in series. A composite sync signal is applied to a data input terminal of a first-stage data latch circuit $L_1'$ via an input terminal $I_3$, and a clock signal having a frequency of double that of the horizontal sync signal is applied to the respective clock input terminals CK via a clock input terminal $I_4$ to actuate the respective data latch circuits $L_1'$, $L_2'$ ..., $L_6'$. The noninverted outputs $Q_1'$-$Q_6'$ of these data latch circuits $L_1'$, $L_2'$ ..., $L_6'$ are ANDed in the AND circuit $AN_2$ to derive an output at an output terminal $O_2$, and thereby it is possible to generate almost no output due to noise other than during vertical synchronizing periods. However, in this circuit, if any noise is inputted during a vertical synchronizing period and vertical sync pulses are deformed, the output will disappear. Accordingly, this prior art circuit has a shortcoming that during a vertical synchronizing period, the vertical sync signal may be lost even for low levels of noise.

It will thus be understood that the prior art vertical sync separator circuits are subject to malfunction as a result of noise, and therefore, reliability in vertical sync separation of a vertical synchronizing circuit system employing a prior art digital circuit of this type is low.

Figure 4:
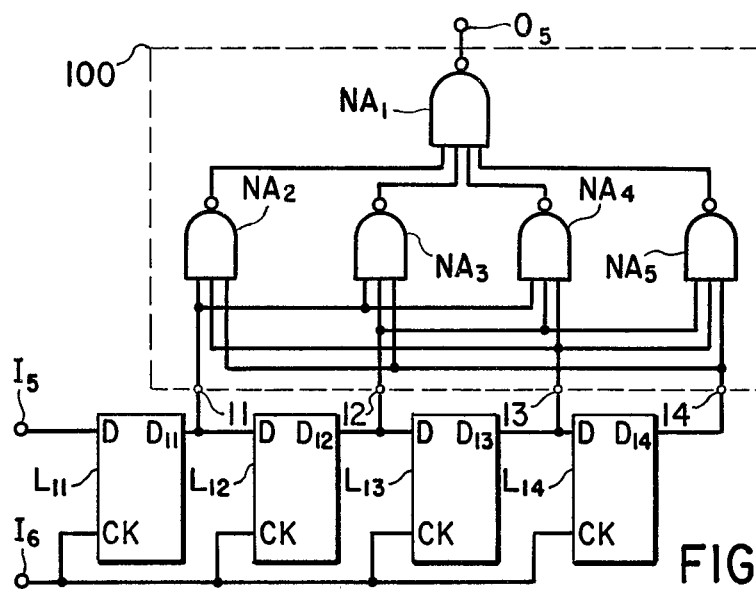
FIG. 4 is a block diagram showing a signal detector circuit according to a first embodiment of the present invention.
Figure 5:
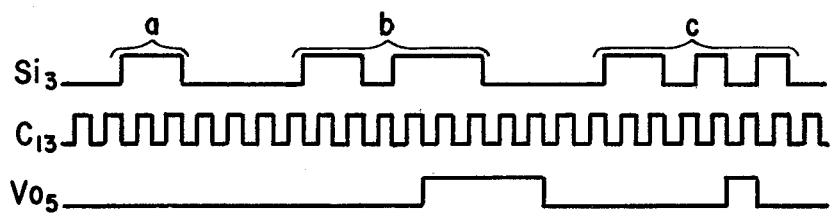
FIG. 5 is a time chart showing input and output waveforms in the circuit shown in FIG. 4.

In the signal detector circuit of the present invention in accordance with the embodiment illustrated in FIGS. 4 and 5, a composite sync signal is applied to an input terminal $I_5$ and to a data input terminal D of a first stage data latch circuit $L_{11}$ serially connected with data latch circuits or stages $L_{12}$, $L_{13}$ and $L_{14}$. The clock terminals CK of the data latch circuits $L_{11}$, $L_{12}$, $L_{13}$ and $L_{14}$ are commonly connected to another input terminal $I_6$, so that they may be driven by a clock signal having a frequency of double that of the vertical sync signal. The clock signal is applied to the input terminal $I_6$. The outputs $Q_{11}$, $Q_{12}$, $Q_{13}$ and $Q_{14}$ of the respective data latch circuits $L_{11}$, $L_{12}$, $L_{13}$ and $L_{14}$ are connected to input terminals 11, 12, 13 and 14, respectively, of a 4-input decision circuit generally designated 100.

The decision circuit 100 is formed of five NAND circuits $NA_1$ to $NA_5$, of which NAND circuits $NA_2$ to $NA_5$ each have three inputs obtained from different combinations of 3 outputs taken from the outputs $Q_{11}$, $Q_{12}$, $Q_{13}$ and $Q_{14}$ of the 4 data latch circuits $L_{11}$, $L_{12}$, $L_{13}$ and $L_{14}$. Thus, for example, the three inputs to NAND circuit $NA_2$ are the outputs $Q_{11}$, $Q_{13}$, and $Q_{14}$, whereas the three inputs to NAND circuits $NA_3$ are the outputs $Q_{11}$, $Q_{12}$, and $Q_{14}$. The inputs of the remaining are NAND circuit $NA_1$ are connected to the outputs of the NAND circuits $NA_2$ to $NA_5$, and the output of the NAND circuit $NA_1$ is connected to an output terminal $O_5$.

In the decision circuit 100 an output signal having a potential level "1" (hereinafter referred to simply as an output "1") can be derived at the output terminal $O_5$ only when outputs "1" appear at 3 or more outputs among the outputs of the 4 data latch circuits $L_{11}$, $L_{12}$, $L_{13}$ and $L_{14}$, as illustrated in FIG. 5. In more detail, when a composite sync signal $S_{i3}$ and a clock signal $C_{13}$ having a frequency double that of the horizontal sync signal are respectively applied to the input terminals $I_5$ and $I_{6,}$, the relation between the composite sync signal $S_{i3}$, the clock signal $C_{13}$ and the sync separation output $V_{o5}$ at the output $O_5$ is illustrated in the time chart of FIG. 5. Since the separation output $V_{o5}$ will not derive an output "1" unless 3 or more of the outputs of the data latch circuits $L_{11}$, $L_{12}$, $L_{13}$, and $L_{14}$ deliver outputs "1", even if the noise added to the composite sync signal during other than the vertical synchronizing period should take the potential level "1" continuously during 2 bits as shown at a in FIG. 5, an erroneous output would not appear at the output terminal $O_5$.

In addition, even if noise should be added to the composite sync signal during a vertical synchronizing period and thereby pulses of 1 bit or 2 bits in the vertical sync pulses should be lost as shown at b or c in FIG. 5, the vertical sync pulses would not be overlooked, because an output "1" is derived from the decision circuit 100 when outputs "1" appear at 3 data latch circuits among the 4 data latch circuits $L_{11}$, $L_{12}$, $L_{13}$ and $L_{14}$.

Regardless of whether it is in a vertical synchronizing period or in a horizontal synchronizing period, an erroneous signal would not appear at the output $O_5$ of the circuit of FIG. 4 in response to a noise signal having a duration of 2 bits or less for the clock frequency.

In the embodiment of the invention shown in FIG. 4, an output is derived under the criterion of 3 outputs out of 4 data latch circuit outputs (hereinafter referred to as (4-3)). However, it is possible to change this criterion depending upon the noise state. In a commercial television receiver set, malfunctions caused by noise can be prevented by means of a circuit system in which 3 or 4 latch circuits are serially connected and 2 or 3 outputs of these circuits are detected by the decision circuit.

Figure 6:
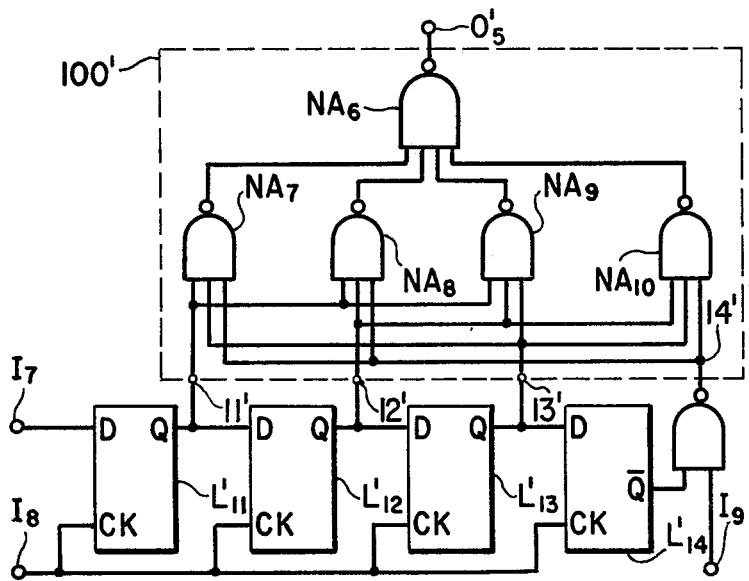
FIG. 6 is a block diagram of a signal detector according to a second embodiment of the present invention.
Figure 7:
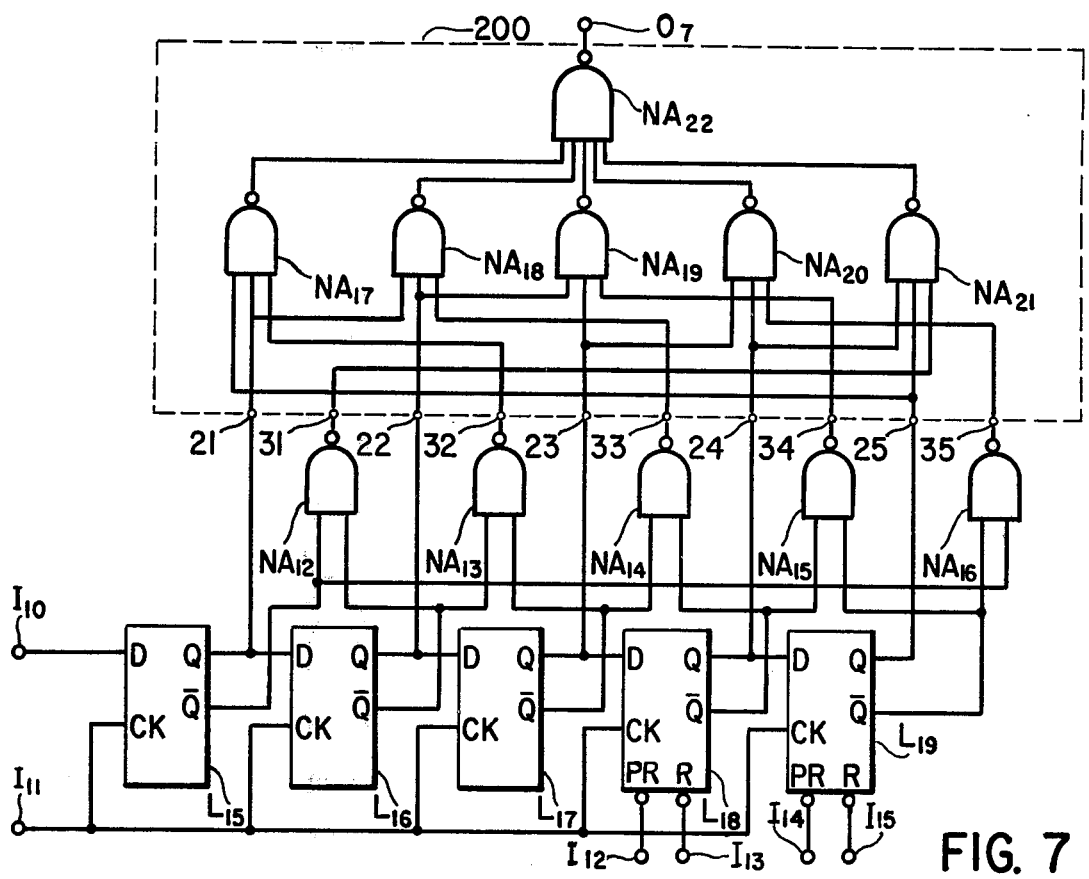
FIG. 7 is a block diagram of a signal detector according to a third embodiment of the present invention.

The embodiments of the invention illustrated in FIGS. 6 and 7 are examples of a circuit arrangement according to the invention in which the criterion is made controllable depending upon external input conditions.

In the embodiment of FIG. 6, 4 data latch circuits $L'_{11}$, $L'_{12}$, $L'_{13}$ and $L'_{14}$ form a series connection in which a noninverted output terminal Q of a preceding state is connected to a data input terminal D of the next succeeding stage. To a data input terminal D of the first stage data latch circuit $L'_{11}$ is connected an input terminal $I_7$, to which a composite sync signal is applied. Clock terminals CK of the data latch circuits $L'_{11}$, $L'_{12}$, $L'_{13}$ and $L'_{14}$ and commonly connected to an input terminal $I_8$, to which a clock signal having a frequency of double that of the horizontal sync signal is applied.

A decision circuit 100' has a similar construction to the decision circuit 100 in the embodiment of FIG. 4, in which the respective 3 inputs of the NAND circuits $NA_7$ to $NA_{10}$ are connected to different combinations of 3 input terminals selected out of 4 input terminals 11' to 14' of the decision circuit 100', and the outputs of the respective NAND circuits $NA_7$ to $NA_{10}$ are connected to 4 inputs of a NAND circuit $NA_6$. Among the input terminals of the decision circuit 100', 3 input terminals 11', 12' and 13' are connected to the output terminals Q of the data latch circuits $L'_{11}$, $L'_{12}$ and $L'_{13}$, respectively, while the remaining input terminal 14' is connected to the output of an additional NAND circuit $NA_{11}$. NAND circuit $NA_{11}$ is provided with two inputs, one being connected to an inverted output $\overline{Q}$ of the last stage data latch circuit $L'_{14}$, and the other input being connected to a control terminal $I_9$. The output of the decision circuit 100' is derived from the output of the NAND circuit $NA_6$ through an output terminal $O'_5$.

By setting the control terminal $I_9$ at a potential level "0", the output of the NAND circuit $NA_{11}$ is always set at a potential level "1". Consequently, in the decision circuit 100', when 2 or more of the outputs of the data latch circuits $L_{11}$, $L_{12}$ and $L_{13}$ deliver output signals of a potential level "1", an output "1" appears at the output of the decision circuit 100'.

If the control terminal $I_9$ is set at a potential level "1", then the output of the NAND circuit $NA_{11}$ will operate in response to the inverted output $\overline{Q}$ of the data latch circuit $L'_{14}$, and so it will apply the same output as the noninverted output Q of the data latch circuit $L'_{14}$ to the input terminal 14'. Accordingly, the operation of the circuit in this case is equivalent to the operation of the circuit shown in FIGS. 4 and 5, and therefore, a decision according to the criterion (4-3) is effected.

In this way, in the circuit shown in FIG. 6, the criterion for decision can be controlled to be either (4-3) or (3-2) depending upon the potential applied to the control terminal $I_9$, so that the circuit can achieve a decision variable depending upon the noise condition. Furthermore, application of the circuit to the case of weak input electromagnetic waves or to the case of a fewer number of pulses in a vertical sync pulse, such as an industrial television, are also made possible by applying a control signal to the control terminal $I_9$.

The control signal applied to the control terminal $I_9$ could be changed either manually or automatically depending upon the decision of the noise state. As one example of the automatic changer circuit, when synchronization is not effected even though the operations of count-525 in the counter circuit for obtaining a vertical sync signal are repeated a predetermined number of times, such a noise state is detected and the control signal is changed.

In addition, an alternative method for controlling the criterion for decision by an external input signal similar to the circuit shown in FIG. 6 is applicable in which the output state of the predetermined data latch circuit is set to a predetermined level irrespective of the input signal.

The embodiment of the invention shown in FIG. 7 is one example of a circuit practicing the above-mentioned alternative method, in which 3 data latch circuits $L_{15}$, $L_{16}$ and $L_{17}$ and 2 modified data latch circuits $L_{18}$ and $L_{19}$, each of which has a preset terminal PR and a reset terminal R, are cascaded in a manner such that a noninverted output terminal Q of a preceding stage data latch circuit is connected to a data input terminal D of the next succeeding stage data latch circuit. To a data input terminal D of the first stage data latch circuit $L_{15}$ is applied a composite sync signal through an input termnal $I_{10}$. Clock terminals CK of the respective data latch circuit $L_{15}$ to $L_{19}$ are commonly connected to a clock input terminal $I_{11}$ so that a clock signal having a frequency double that of the horizontal sync signal is applied thereto. The preset terminal PR and the reset terminal R of the data latch circuit $L_{18}$ are connected to control signal input terminals $I_{12}$ and $I_{13}$, respectively, and likewise the preset terminal PR and reset terminal R of the data latch circuit $L_{19}$ are connected to control signal input terminals $I_{14}$ and $I_{15}$, respectively. While inverters illustrated by the symbol "0" are associated to the preset terminals PR and reset terminals R of the data latch circuits $L_{18}$ and $L_{19}$, these could be omitted by inverting the potential states of the control signals applied to the control signal input terminals $I_{12}$ to $I_{15}$. The respective non-inverted outputs Q of the data latch circuits $L_{15}$ to $L_{19}$ are connected to input terminals 21 to 25, respectively, of a decision circuit 200. The inverted outputs $\overline{Q}$ are subjected to logical processing by means of NAND circuits $NA_{12}$ to $NA_{16}$, and are connected to the other input terminals 31 to 35 of the decision circuit 200. These NAND circuits $NA_{12}$ to $NA_{16}$ operate to take a NAND logic of inverted outputs of two successive data latch circuits (assuming that $L_{15}$ succeeds to $L_{19}$) and to apply the resulting signal to corresponding ones of the input terminals 31 to 35, in such a manner that the NAND circuit $NA_{12}$ takes a NAND logic of the inverted outputs $\overline{Q}$ of the data latch circuits $L_{15}$ and $L_{16}$ and applies the resulting signal to the input terminal 31, the NAND circuit $NA_{13}$ takes a NAND logic of the inverted outputs $\overline{Q}$ of the data latch circuits $L_{16}$ and $L_{17}$ and applies the resulting signal to the input terminal 32, and so on. The decision circuit 200 is composed of 3-input NAND circuits $NA_{17}$ to $NA_{21}$ and a 5-input NAND circuit $NA_{22}$. The inputs of the NAND circuit $NA_{17}$ are connected to the input terminals 25, 21 and 32, the inputs of the NAND circuit $NA_{18}$ are connected to the input terminals 21, 22 and 33, the inputs of the NAND circuit $NA_{19}$ are connected to the input terminals 22, 23 and 34, the inputs of the NAND circuit $NA_{20}$ are connected to the input terminals 23, 24 and 35, and the inputs of the NAND circuit $NA_{21}$ are connected to the input terminals 24, 25 and 31. The respective inputs of the NAND circuit $NA_{21}$ are connected to the input terminals 24, 25 and 31. The inputs of the NAND circuit $NA_{22}$ are respectively connected to the outputs of the NAND circuits $NA_{17}$ to $NA_{21}$, and the output of the NAND circuit $NA_{22}$ is connected to an output terminal $O_7$.

Now it is assumed that control signals of a potential level "1" are applied to all the control signal input terminals $I_{12}$ to $I_{15}$. Since inverters are connected to both the preset terminals PR and the reset terminals R of the data latch circuits $L_{18}$ and $L_{19}$, these data latch circuits $L_{18}$ and $L_{19}$ are neither preset nor reset, and so they operate as normal data latch circuits. The inputs of the NAND circuit $NA_{17}$ are applied with the noninverted outputs Q of the data latch circuits $L_{15}$ and $L_{19}$ and the output of the NAND circuit $NA_{13}$, and the NAND circuit $NA_{13}$ delivers a potential lever "0" at its output when either one of the inverted outputs $\overline{Q}$ of the data latch circuits $L_{16}$ and $L_{17}$ takes a potential level "0". Therefore, the NAND circuit $NA_{17}$ delivers a potential level "0" at its output when the noninverted outputs of the data latch circuits $L_{15}$ an $L_{19}$ and the noninverted output Q of either the data latch circuit $L_{16}$ or $L_{17}$ take a potential level "1". Likewise, the NAND circuits $NA_{18}$ to $NA_{21}$ also deliver a potential level "0" at their outputs when the noninverted outputs Q of 3 data latch circuits in each one of 4 different combinations of 4 data latch circuits take a potential level "1". Accordingly, a potential level "1" appears at the output terminal $O_7$ when the noninverted outputs Q of any 3 data latch circuits among the 5 data latch circuits $L_{15}$ to $L_{19}$ take a potential level "1". In other words, this circuit operates under the criterion (5-3).

Assuming now that a control signal at a potential level "0" is applied only to the control signal input terminal $I_{15}$, the data latch circuit $L_{19}$ is reset, so that a potential level "0" appears at the noninverted output Q while a potential level "1" appears at the inverted output $\overline{Q}$. Consequently, the same outputs as the noninverted outputs Q of the data latch circuits $L_{18}$ and $L_{15}$ are derived at the outputs of the NAND circuits $NA_{15}$ and $NA_{16}$. In addition, the NAND circuits $NA_{17}$ and $NA_{21}$ become inoperative, so that their outputs are fixed at a potential level "1". Accordingly, NAND circuit $NA_{18}$ delivers a potential level "0" at its output, when the noninverted outputs Q of the data latch circuits $L_{15}$ and $L_{16}$ take a potential level "1" and also when either one of the inverted outputs $\overline{Q}$ of the data latch circuits $L_{17}$ and $L_{18}$ takes a potential level "0" (the corresponding noninverted output Q taking a potential level "1"). On the other hand, the NAND circuits $NA_{19}$ and $NA_{20}$ deliver a potential level "0" at their outputs when all the noninverted outputs Q of the data latch circuits $L_{16}$, $L_{17}$ and $L_{18}$ take a potential level "1", and when all the noninverted outputs Q of the data latch circuits $L_{17}$, $L_{18}$ and $L_{15}$ take a potential level "1". Consequently, a decision operation under the criterion (4-3) is effected in that an output signal "1" is obtained at the output terminal $O_7$ if any 3 outputs of the 4 noninverted outputs Q of the data latch circuits $L_{15}$ to $L_{18}$ take a potential level "1".

When a control signal at a potential level "0" is applied to the control signal input terminals $I_{13}$ and $I_{15}$ while a control signal at a potential level "1" is applied to the control signal input terminals $I_{12}$ and $I_{14}$, the data latch circuits $L_{18}$ and $L_{19}$ are reset, and consequently, the outputs for the NAND circuits $NA_{17}$, $NA_{19}$, $NA_{20}$ and $NA_{21}$ are fixed at a potential level "1". Accordingly, only the NAND circuit $NA_{18}$ determines the output states of the data latch circuits $L_{15}$, $L_{16}$ and $L_{17}$, so that a decision operation under the criterion (3-3) is effected in that a potential level "1" can be outputted at the output terminal $O_7$ only when all the outputs at the noninverted output terminals Q of the 3 data latch circuits $L_{15}$ to $L_{17}$ take a potential level "1".

Assuming now that a control signal at a potential level "0" is applied only to the control signal input terminal $I_{14}$, then the data latch circuit $L_{19}$ is preset, so that its noninverted output Q is fixed at a potential level "1" and its inverted output $\overline{Q}$ is fixed at a potential level "0". The outputs of the NAND circuits $NA_{15}$ and $NA_{16}$ are fixed at a potential level "1". As a result, the NAND circuit $NA_{17}$ delivers a potential level "0" at its output when the noninverted outputs Q of the data latch circuit $L_{15}$ and the data latch circuit $L_{16}$ or $L_{17}$ take a potential level "1", the NAND circuit $NA_{19}$ delivers a potential level "0" at its output when the noninverted outputs Q of the data latch circuits $L_{16}$ and $L_{17}$ take a potential level "1", the NAND circuit $NA_{20}$ delivers a potential level "0" at its output when the noninverted outputs Q of the data latch circuits $L_{17}$ and $L_{18}$ take a potential level "1", and the NAND circuit $NA_{21}$ delivers a potential level "0" at its output when the noninverted outputs Q of the data latch circuit $L_{18}$ and the data latch circuit $L_{15}$ or $L_{16}$ take a potential level "1". This operation is a decision operation under the criterion (4-2) in that an output at a potential level "1" is derived at the output terminal $O_7$ if any 2 outputs of the 4 noninverted outputs Q of the data latch circuits $L_{15}$ to $L_{18}$ take a potential level "1". During this operation, the NAND circuit $NA_{18}$ performs its normal operation, but it effects nothing upon the decision operation under the criterion (4-2).

In the case in which control signals at a potential level "0" are applied to the control signal input terminals $I_{12}$ and $I_{14}$ while control signals at a potential level "1" are applied to the control signal input terminals $I_{13}$ and $I_{15}$, then both the data latch circuits $L_{18}$ and $L_{19}$ are preset, so that their noninverted outputs Q are fixed at a potential level "1" and their inverted outputs $\overline{Q}$ are fixed at a potential level "0". The outputs of the NAND circuits $NA_{14}$ to $NA_{16}$ are fixed at a potential "1". Consequently, the NAND circuit $NA_{20}$ delivers a potential level "0" at its output when the noninverted output Q of the data latch circuit $L_{17}$ is at a potential level "1", while the NAND circuit $NA_{21}$ delivers a potential level "0" at its output when the noninverted output Q of the data latch circuit $L_{15}$ or $L_{16}$ is at a potential level "1", and thereby an output signal at a potential level "1" is obtained at the output terminal $O_7$ when any one of the noninverted output of the data latch circuits $L_{15}$ to $L_{16}$ takes a potential level "1". This operation is a decision operation under the criterion (3-1). In this assumed case, the NAND circuits $NA_{17}$ to $NA_{19}$ effect nothing upon the decision operation under the criterion (3-1), because they deliver a potential level "0" at their outputs when any 2 of the noninverted outputs Q of the data latch circuits $L_{15}$, $L_{16}$ and $L_{17}$ take a potential level "1".

As fully described above, the circuit shown in FIG. 7 can vary the criterion for decision by the control signals applied to the control signal input terminals. The relation between the control signals and the criterion is described in the following TABLE 1.

TABLE 1

| Signal of Input Terminal $I_{12}$ | Signal of Input Terminal $I_{13}$ | Signal of Input Terminal $I_{14}$ | Signal of Input Terminal $I_{15}$ | Criterion for Decision |
|---|---|---|---|---|
| 1 | 1 | 1 | 1 | (5-3) |
| 1 | 1 | 1 | 0 | (4-3) |
| 1 | 0 | 1 |   | (3-3) |
| 1 | 1 | 0 |   | (4-2) |
| 0 | 1 | 0 |   | (3-1) |

Figure 8:
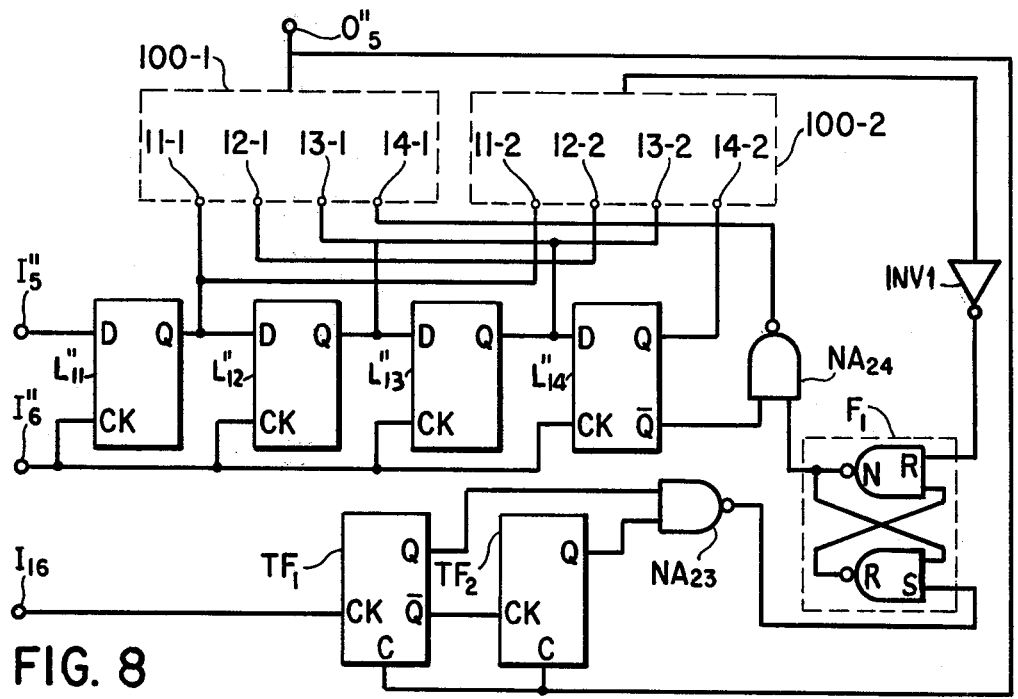
FIG. 8 is a block diagram of a signal detector according to a embodiment of the present invention.

The embodiment of the invention illustrated in FIG. 8 is arranged to change automatically the criterion for decision according to the input signal condition. Four data latch circuits $L''_{11}$ to $L''_{14}$ are serially connected in the manner than the noninverted output terminal Q of the preceding stage is connected to the data input terminal D of the succeeding stage. The clock signal is applied to the clock terminals CK of the respective data latch circuits $L''_{11}$ to $L''_{15}$ through the clock input terminal $I''_6$. A composite sync signal is applied to the serially connected data latch circuits $L''_{11}$ to $L''_{14}$ through the input terminal $I''_5$, and shifted from the data latch circuit $L''_{11}$ to $L''_{14}$ according to the clock signal having a frequency twice of that of the horizontal sync signal. The above circuit configuration is the same as that of the data latch circuits $L_{11}$ to $L_{14}$ shown in FIG. 4. The decision circuits 100-1 and 100-2 which also have the same circuit configuration as the decision circuit 100 shown in FIG. 4 are provided for detecting the output state of the data latch circuits $L''_{11}$ to $L''_{14}$. While the input terminals 11-1, 12-1 and 13-1 are respectively connected to the noninverted outputs Q of the data latch circuits $L''_{11}$ to $L''_{13}$, the remaining input terminal 14-1 is connected to the output of the NAND circuit $NA_{24}$. The output of the decision circuit 100-1 is derived from the output terminal $O''_5$ as a detected output, and is also applied to the clear terminals C of the T-type flip-flops $TF_1$ and $TF_2$. The input terminals 11-2, 12-2, 13-2 and 14-2 are respectively connected to the noninverted output terminals Q of the data latch circuits $L''_{11}$, $L''_{12}$, $L''_{13}$ and $L''_{14}$. The output of the decision circuit 100-2 is applied to the reset terminal R of the flip-flop $F_1$ consisting of two NAND circuit after being inverted by the inverter $INV1$. Furthermore, a clock pulse, for example, a signal having a frequency of the vertical sync signal, is applied to the clock terminal CK of the T-type flip-flop $TF_1$ through the clock pulse input terminal $I_{16}$. The inverted output terminal Q of the T-type flip-flop $TF_1$ is connected to the clock terminal CK of the T-type flip-flop $TF_2$. The noninverted output terminals Q are connected to the inputs of the NAND circuit $NA_{23}$. The T-type flip-flops TF1 and TF2 count the clock pulse applied to the clock pulse input terminal $I_{16}$ until the T-type flip-flops $TF_1$ and $TF_2$ are cleared by the output of the decision circuit 100-1. If the output is not produced at the output terminal $O''_5$, a signal having a potential level "0" is derived from the NAND circuit $NA_{23}$ after a predetermined number (3 in this embodiment) is counted by the T-type flip-flops $TF_1$ and $TF_2$. The output of the NAND circuit $NA_{23}$ is applied to the set terminal S of the flip-flop $F_1$. The output terminal N of the flip-flop $F_1$ is inputted to the NAND circuit $NA_{24}$.

The operation of the embodiment of FIG. 8 can now be explained. First, it is assumed that the normal operation of the circuit is maintained under the condition of the (4-3) criterion. At the same time when the output is produced at the output terminal $O''_5$, the decision circuit 100-2 derives an output which is applied to the reset terminal R of the flip-flop $F_1$ after being inverted by the inverter $INV_1$, and the output of the decision circuit 100-2 clears the T-type flip-flops $TF_1$ and $TF_2$ to apply a potential level "1" to the set terminal S of the flip-flop $F_1$ through NAND circuit $NA_{23}$. Therefore, output terminal N of the flip-flop $F_1$ becomes a potential level "1", and the same signal as the noninverted output terminal Q of the data latch circuit $L''_{14}$ is obtained from the NAND circuit $NA_{24}$. As a result, the circuit continues to operate under the condition of the (4-3) criterion. In the time duration between two outputs, the decision circuit 100-2 derives an output of a potential level "0" and then the potential level of the reset terminal $F_1$ becomes "1". However, the output of the NAND circuit $NA_{23}$ remains at its potential level "1". Consequently, the potential level of the output terminal N of the flip-flop $F_1$ keeps "1" to continue the operation under the condition of (4-3) criterion.

When the decision circuit 100-1 operating under the condition of (4-3) criterion does not produce any output at the output terminal $O''_5$, the potential level of the reset terminal R is kept at "1", because no output is derived from the decision circuit 100-2. In addition, the T-type flip-flops $TF_1$ and $TF_2$ are not cleared. After the T-type flip-flops $TF_1$ and $TF_2$ count the clock pulses applied to the the clock pulse input terminal $I_{16}$ by the predetermined number, an output having a potential level "0" is produced at the output terminal of the NAND circuit $NA_{23}$ and is applied to the set terminal S of the flip-flop $F_1$. As a result, an output having a potential level "0" is derived at the output terminal N of the flip-flop $F_1$ and then the output of the NAND circuit $NA_{24}$ is fixed at a potential level "1" irrespective of the output of the data latch circuit $L''_{14}$. The decision circuit 100-1 changes to operate under the condition of the (3-2) criterion, which is the same as that explained in the second described embodiment of FIG. 6. After the circuit is changed to an operation under the condition of the (3-2) criterion, an output is obtained at the output terminal $O''_5$ and clears the T-type flip-flops $TF_1$ and $TF_2$ to apply a potential level "1" to the set terminal S of the flip-flop $F_1$. However, the decision circuit 100-2 does not produce any output because it operates under the (4-3) criterion, so the reset terminal R continues to receive a signal of a potential level "1". Therefore, the output terminal N of the flop-flop $F_1$ keeps its output at the prior potential, that is a potential "0", allowing the circuit to continue the operation of the (3-2) criterion.

Thereafter, if the noise occurrence changes to a condition that an output can be produced under the decision condition of the (4-3) criterion from the output terminal $O''_5$, an output is produced from the decision circuit 100-2 to reset the flip-flop $F_1$ and to derive a potential level "1" at the output terminal N. Therefore, the signal at the noninverted terminal Q of the data latch circuit $L''_{14}$ is applied to the input terminal 14-1 of the decision circuit 100-1 from the output terminal of the NAND circuit $NA_{24}$, resulting in a change in the operating condition of the decision circuit 100-1 from the (3-2) criterion to the (4-3) criterion.

In the circuit of FIG. 8, the decision criterion automatically changes according to the condition of the noise occurrence. Therefore, this circuit is suitable for fabrication as a semiconductor integrated circuit which is manufactured in a mass-production scale, and for a vertical sync separator for use in a portable television receiver.

While the data latch circuits whose number is larger by one than the number of pulses to be detected are serially connected, as illustrated in FIGS. 4 and 6, the number of the serially connected data latch circuits may be increased by arranging the decision circuit to pick up one output at the time when the number of the pulses to be detected is inputted.

In the above embodiments, which are examples of the present invention, an output having a potential level "1" is derived. That is, the circuits herein described are constructed by logic circuits operating under the positive logic theory. It is to be also understood that a signal having a potential level "0" can also be obtained as an output from the circuit of the invention. For this purpose, the logic circuits in the decision circuit should be designed to operate under a negative logic theory and the outputs Q and $\overline{Q}$ are reversed. Such decision circuits are constructed by the NOR logic circuits in place of NAND logic circuits as herein described.

In addition, although the invention has been described above, by way of example, as embodied in a vertical sync separator circuit for a television receiver, the pulse separator circuit according to the present invention can be applied generally to various other circuits to detect a predetermined number of consecutive pulses or a signal state holding a predetermined potential for a predetermined period.

What is claimed is:

1. A signal detector circuit comprising:
n stages of data latch circuits connected in series;
an input terminal coupled to a first stage of said data latch circuits for receiving an input signal;
means for applying clock pulses to said data latch circuits to shift a signal from said input terminal along said data latch circuits;
a plurality of first logic circuits each having $n-m$ input ends and an output end and deriving an output in response to $n-m$ inputs;
means for connecting the output ends of selected $n-m$ ones of said data latch circuits to said $n-m$ input ends of selected ones of said first logic circuits in such a manner that the output ends of different ones of said data latch circuits are combined with the input ends of different ones of said first logic circuits;
a second logic circuit having an input end connected to the output ends of said first logic circuits and an output end, and deriving an output in response to an input applied to said input end; and
an output terminal coupled to said output end of said second logic circuit,
said integer n is an integer of 3 to 6, and said input signal is a composite synchronizing signal in a television signal, said output signal derived from said output terminal corresponding to the vertical synchronizing pulses in said composite synchronizing signal.

2. A signal detector circuit comprising:
n stages of data latch circuits connected in series;
an input terminal coupled to a first stage of said data latch circuits for receiving an input signal;
means for applying clock pulses to said data latch circuits to shift a signal from said input terminal along said data latch circuits;
a plurality of first logic circuits each having $n-m$ input ends and an output end and deriving an output in response to $n-m$ inputs;
means for connecting the output ends of selected $n-m$ ones of said data latch circuits to said $n-m$ input ends of selected ones of said first logic circuits in such a manner that the output ends of different ones of said data latch circuits are combined with the input ends of different ones of said first logic circuits;
a second logic circuit having an input end connected to the output ends of said first logic circuits and an output end, and deriving an output in response to an input applied to said input end;
an output terminal coupled to said output end of said second logic circuit,
a third logic circuit having a first input end connected to the inverted output end of the last stage of said data latch circuits, a second input connected to receive a control signal, and an output end connected to the input ends of selected ones of said first logic circuits.

3. A signal detector circuit according to claim 2, further comprising additional logic means having input ends connected to the inverted outputs of selected ones of said data latch circuits, and output ends connected to the input ends of selected ones of said first logic circuits.

4. A logic circuit according to claim 3, in which at least one of said data latch circuits includes preset and reset terminals respectively connected to receive first and second control signals.

* * * * *